United States Patent
Ryu et al.

(10) Patent No.: US 11,333,411 B2
(45) Date of Patent: May 17, 2022

(54) HEAT PUMP WITH SIMULTANEOUS COOLING AND DEFROSTING OF HEAT EXCHANGERS ARRANGED IN PARALLEL

(71) Applicant: LG ELECTRONICS INC., Seoul (KR)

(72) Inventors: Byoungjin Ryu, Seoul (KR); Sangil Park, Seoul (KR); Yoonho Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 16/748,982

(22) Filed: Jan. 22, 2020

(65) Prior Publication Data

US 2020/0240682 A1   Jul. 30, 2020

(30) Foreign Application Priority Data

Jan. 25, 2019   (KR) .................... 10-2019-0009711

(51) Int. Cl.
*F25B 13/00*   (2006.01)
*F25B 41/31*   (2021.01)
*F25B 41/385*   (2021.01)

(52) U.S. Cl.
CPC .............. *F25B 13/00* (2013.01); *F25B 41/31* (2021.01); *F25B 41/385* (2021.01);
(Continued)

(58) Field of Classification Search
CPC ................ F25B 13/00; F25B 2313/006; F25B 2313/0233; F25B 2313/02741
See application file for complete search history.

(56) References Cited

U.S. PATENT DOCUMENTS

| | | | |
|---|---|---|---|
| 2004/0093893 A1* | 5/2004 | Tanimoto | .............. F25B 49/025 62/510 |
| 2012/0043056 A1* | 2/2012 | Shimazu | .................. F24F 11/84 165/96 |

(Continued)

FOREIGN PATENT DOCUMENTS

| | | |
|---|---|---|
| EP | 1 445 556 | 8/2004 |
| EP | 2 894 410 | 7/2015 |

(Continued)

OTHER PUBLICATIONS

European Search Report issued in Application No. 20153586.1 dated Jun. 3, 2020.

*Primary Examiner* — Henry T Crenshaw
(74) *Attorney, Agent, or Firm* — Ked & Associates LLP

(57) ABSTRACT

An air conditioner may include a continuous refrigeration apparatus including a first gas control unit connected to a first indoor heat exchanger, a second gas control unit connected to a second indoor heat exchanger, a first pipe connecting a liquid pipe of an outdoor unit and a liquid of an indoor unit, and a second pipe branched from the first pipe and connected to the first and second gas control units. The first gas control unit may include a first-first flow path connecting the first gas control unit to the second pipe; a first-second flow path connected to the first-first flow path, and through which refrigerant discharged from the first indoor heat exchanger flows during a refrigeration operation; and a first-third flow path connected in parallel with the first-second flow path, and guiding refrigerant from the compressor to the first indoor heat exchanger during a defrosting operation.

10 Claims, 5 Drawing Sheets

(52) U.S. Cl.
CPC . *F25B 2313/006* (2013.01); *F25B 2313/0233* (2013.01); *F25B 2313/02741* (2013.01)

(56) References Cited

U.S. PATENT DOCUMENTS

| | | | | |
|---|---|---|---|---|
| 2015/0176876 A1* | 6/2015 | Tamura | ............ | F25B 13/00 |
| | | | | 62/196.1 |
| 2015/0292789 A1* | 10/2015 | Takenaka | ............ | F25B 47/022 |
| | | | | 62/140 |
| 2016/0273795 A1* | 9/2016 | Takenaka | ............ | F25B 47/022 |
| 2016/0370045 A1* | 12/2016 | Takenaka | ............ | F28D 1/0443 |
| 2019/0107314 A1* | 4/2019 | Watanabe | ............ | F24F 11/72 |

FOREIGN PATENT DOCUMENTS

| | | |
|---|---|---|
| EP | 3 521 716 | 8/2019 |
| WO | WO 2018/061188 | 4/2018 |

* cited by examiner

HEAT PUMP WITH SIMULTANEOUS COOLING AND DEFROSTING OF HEAT EXCHANGERS ARRANGED IN PARALLEL

CROSS-REFERENCE TO RELATED PATENT APPLICATIONS

This application claims priority benefit of Korean Application No. 10-2019-0009711 filed on Jan. 25, 2019, whose entire disclosure is hereby incorporated by reference.

BACKGROUND OF THE INVENTION

1. Field of the Invention

The present disclosure relates to an air conditioner, and more particularly, to an air conditioner operated in such a manner that when some of a plurality of indoor heat exchangers installed in a low temperature warehouse perform a defrosting operation, the other indoor heat exchangers perform a refrigeration operation.

2. Description of the Related Art

A refrigeration cycle generally means a cycle of supplying heat to a place that needs heat or absorbing heat by using a circulation cycle of a refrigerant. A compressor, a condenser, an expansion valve, and an evaporator are used to implement such a refrigeration cycle.

An apparatus or system for heating or cooling indoor air using such a refrigeration cycle is called an air conditioner. The air conditioner may cool or heat the indoor air by providing the heat of the refrigerant to the indoor air or by taking the heat of the indoor air into the refrigerant.

An evaporator of an air conditioner may be installed in a warehouse, a refrigerant may absorb the heat in the warehouse to provide a low temperature warehouse, and a plurality of the evaporators may be installed in the low temperature warehouse.

Frost may be formed in the evaporator installed in the low temperature warehouse (the indoor), which degrades the heat exchange performance.

Accordingly, an air conditioner in which a heater is provided in the evaporator in order to remove frost formed in the evaporator or hot gas discharged from the compressor is introduced to perform a defrosting operation has been launched.

However, such a conventional air conditioner has a problem in that a temperature is increased in a low temperature warehouse (indoor) due to a heater, or a plurality of heat exchangers installed in the low temperature warehouse perform defrosting operation simultaneously to increase the temperature of the low temperature warehouse.

In addition, in the case of the air conditioner in which a plurality of heat exchangers are provided in the low temperature warehouse and hot gas discharged from the compressor is introduced into the plurality of heat exchangers provided in the low temperature warehouse, three or more connection pipes between an indoor unit and an outdoor unit are required. Accordingly, there is a problem in that the cost is increased.

SUMMARY OF THE INVENTION

The present disclosure has been made in view of the above problems, and provides an air conditioner in which hot gas discharged from a compressor is introduced into some of a plurality of indoor heat exchangers to perform a defrosting operation, and the other indoor heat exchangers perform a refrigeration operation.

The present disclosure further provides an air conditioner that connects an outdoor unit and an indoor unit with two pipes, while some of a plurality of indoor heat exchangers perform a defrosting operation and the other indoor heat exchangers perform a refrigeration operation.

In accordance with an aspect of the present disclosure, an air conditioner includes: an outdoor unit including a compressor for compressing a refrigerant, and an outdoor heat exchanger for heat-exchanging outdoor air with the refrigerant; an indoor unit including a plurality of indoor heat exchangers for heat-exchanging indoor air with the refrigerant, and an indoor expansion valve which is connected to the plurality of indoor heat exchangers and expands the refrigerant; and a continuous refrigeration apparatus including a first gas control unit connected to a first indoor heat exchanger of the plurality of indoor heat exchangers, a second gas control unit connected to a second indoor heat exchanger of the plurality of indoor heat exchangers, a first pipe connecting a liquid pipe of the outdoor unit and a liquid of the indoor unit, and a second pipe which is branched from the first pipe and connected to the first gas control unit and the second gas control unit.

The first gas control unit includes: a first-first flow path connecting the first gas control unit to the second pipe; a first-second flow path which is connected to the first-first flow path, and through which the refrigerant discharged from the first indoor heat exchanger flows during a refrigeration operation of the first indoor heat exchanger; and a first-third flow path which is connected in parallel with the first-second flow path, and guides the refrigerant discharged from the compressor to the first indoor heat exchanger during a defrosting operation of the first indoor heat exchanger, and connects a gas pipe of the outdoor unit and the first indoor heat exchanger.

The second gas control unit includes: a second-first flow path connecting the second gas control unit to the second pipe; a second-second flow path which is connected to the second-first flow path, and through which the refrigerant discharged from the second indoor heat exchanger flows during a refrigeration operation of the second indoor heat exchanger; and a second-third flow path which is connected in parallel with the second-second flow path, and guides the refrigerant discharged from the compressor to the second indoor heat exchanger during a defrosting operation of the second indoor heat exchanger, and connects the gas pipe of the outdoor unit and the second indoor heat exchanger.

The outdoor unit includes a four-way valve for guiding the refrigerant discharged from the compressor to the outdoor heat exchanger or the indoor heat exchanger selectively.

The four-way valve guides the refrigerant discharged from the compressor to the outdoor heat exchanger, in the refrigeration operation of all the plurality of indoor heat exchangers, and guides the refrigerant discharged from the compressor to the gas pipe of the outdoor unit, in the defrosting operation of at least one of the plurality of indoor heat exchangers.

The continuous refrigeration apparatus includes a plurality of gas control units including the first gas control unit and the second gas control unit.

The plurality of gas control units are provided in the same number of the plurality of indoor heat exchangers.

The first pipe has one end connected to the liquid pipe of the outdoor unit, and the other end connected to the liquid pipe of the indoor unit, one end of the first gas control unit and one end of the second gas control unit are converged to be connected to the gas pipe of the outdoor unit, the other end of the first gas control unit is connected to the first indoor heat exchanger, and the other end of the second gas control unit is connected to the second indoor heat exchanger.

The first gas control unit includes: a first-first solenoid valve which is installed in the first-first flow path, and controls a flow of the refrigerant flowing through the first-first flow path; and a first-second solenoid valve which is installed in the first-third flow path, and controls a flow of the refrigerant flowing through the first-third flow path.

The second gas control unit includes: a second-first solenoid valve which is installed in the second-first flow path, and controls a flow of the refrigerant flowing through the second-first flow path; and a second-second solenoid valve which is installed in the second-third flow path, and controls a flow of the refrigerant flowing through the second-third flow path.

The first-first solenoid valve is opened during the refrigeration operation of the first indoor heat exchanger, and is closed during the defrosting operation of the first indoor heat exchanger.

The first-second solenoid valve is opened during the defrosting operation of the first indoor heat exchanger, and is closed during the refrigeration operation of the first indoor heat exchanger and the defrosting operation of the second indoor heat exchanger.

The second-first solenoid valve is opened during the refrigeration operation of the second indoor heat exchanger, and is closed during the defrosting operation of the second indoor heat exchanger.

The second-second solenoid valve is opened during the defrosting operation of the second indoor heat exchanger, and is closed during the defrosting operation of the first indoor heat exchanger and the refrigeration operation of the second indoor heat exchanger.

The first gas control unit includes a first-first check valve which is installed in the first-second flow path, and blocks a flow, toward the first-first flow path and the first-second flow path, of the refrigerant introduced into the first gas control unit from the gas pipe of the outdoor unit, and guides the refrigerant toward the first-third flow path.

The second gas control unit includes a second-first check valve which is installed in the second-second flow path, and blocks a flow, toward the second-first flow path and the second-second flow path, of the refrigerant introduced into the second gas control unit from the gas pipe of the outdoor unit, and guides the refrigerant toward the second-third flow path.

The first gas control unit includes a first-second check valve which is installed in the first-third flow path, and blocks a flow of the refrigerant, which is introduced into the first gas control unit from the first indoor heat exchanger, flowing through the first-third flow path, and guides the refrigerant toward the first-second flow path.

The second gas control unit includes a second-second check valve which is installed in the second-third flow path, and blocks a flow of the refrigerant, which is introduced into the second gas control unit from the second indoor heat exchanger, flowing through the second-third flow path, and guides the refrigerant toward the second-second flow path.

The continuous refrigeration apparatus includes: a defrost expansion valve installed in the first pipe; a first pipe check valve which is disposed in parallel with the defrost expansion valve and blocks a refrigerant flow flowing from the indoor unit to the outdoor unit; and a second pipe check valve which is installed in the second pipe and blocks a flow of the refrigerant flowing from the first pipe to the second pipe.

The indoor expansion valve includes: a first indoor expansion valve which is installed in a flow path connecting the first indoor heat exchanger and the liquid pipe of the indoor unit; and a second indoor expansion valve which is installed in a flow path connecting the second indoor heat exchanger and the liquid pipe of the indoor unit.

In accordance with another aspect of the present disclosure, an air conditioner includes: an outdoor unit including a compressor for compressing a refrigerant, an outdoor heat exchanger for heat-exchanging outdoor air with the refrigerant, an outdoor unit gas pipe connected to the compressor, and an outdoor unit liquid pipe connected to the outdoor heat exchanger; an indoor unit including a plurality of indoor heat exchangers for heat-exchanging indoor air with the refrigerant, a plurality of indoor unit gas pipes connected to one end of the plurality of indoor heat exchangers respectively, an indoor unit liquid pipe connected to the other end of the plurality of indoor heat exchangers, and a plurality of indoor expansion valves installed in a flow path connecting the indoor unit liquid pipe and the plurality of indoor heat exchangers respectively; and a continuous refrigeration apparatus which is disposed between the outdoor unit and the indoor unit, connects the outdoor unit gas pipe and the plurality of indoor unit gas pipes, and connects the outdoor unit liquid pipe and the indoor unit liquid pipe.

The continuous refrigeration apparatus includes: a plurality of gas control units which are connected to the outdoor unit gas pipe, and branched to be connected to the plurality of indoor unit gas pipes respectively; a first pipe having one end connected to the outdoor unit liquid pipe and the other end connected to the indoor unit liquid pipe; and a second pipe connecting the first pipe and the plurality of gas control units.

Each of the plurality of gas control units includes: a first flow path connecting the gas control unit and the second pipe; a second flow path which is connected to the first flow path, and connects the outdoor unit gas pipe and the indoor unit gas pipe; and a third flow path connected in parallel with the second flow path.

Each of the plurality of gas control units includes: a first solenoid valve installed in the first flow path; a first check valve which is installed in the second flow path, installed closer to the outdoor unit side than a point where the first flow path and the second flow path are connected, and blocks a flow of the refrigerant flowing from the outdoor unit toward the first flow path and the second flow path; a second solenoid valve installed in the third flow path; and a second check valve which is installed in the third flow path, installed closer to the indoor unit side than the second solenoid valve, and blocks a flow of the refrigerant flowing from the indoor unit to the third flow path.

The continuous refrigeration apparatus includes: a defrost expansion valve installed in the first pipe; a first pipe check valve which is disposed in parallel with the defrost expansion valve, and blocks a refrigerant flow flowing from the indoor unit to the outdoor unit; and a second pipe check valve which is installed in the second pipe and installed closer to the liquid pipe side of the outdoor unit than the plurality of gas control units, and blocks a flow of the refrigerant flowing from the first pipe to the second pipe.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Hereinafter, the present disclosure will be described with reference to the drawings for explaining an air conditioner according to embodiments of the present disclosure.

Figure 1:
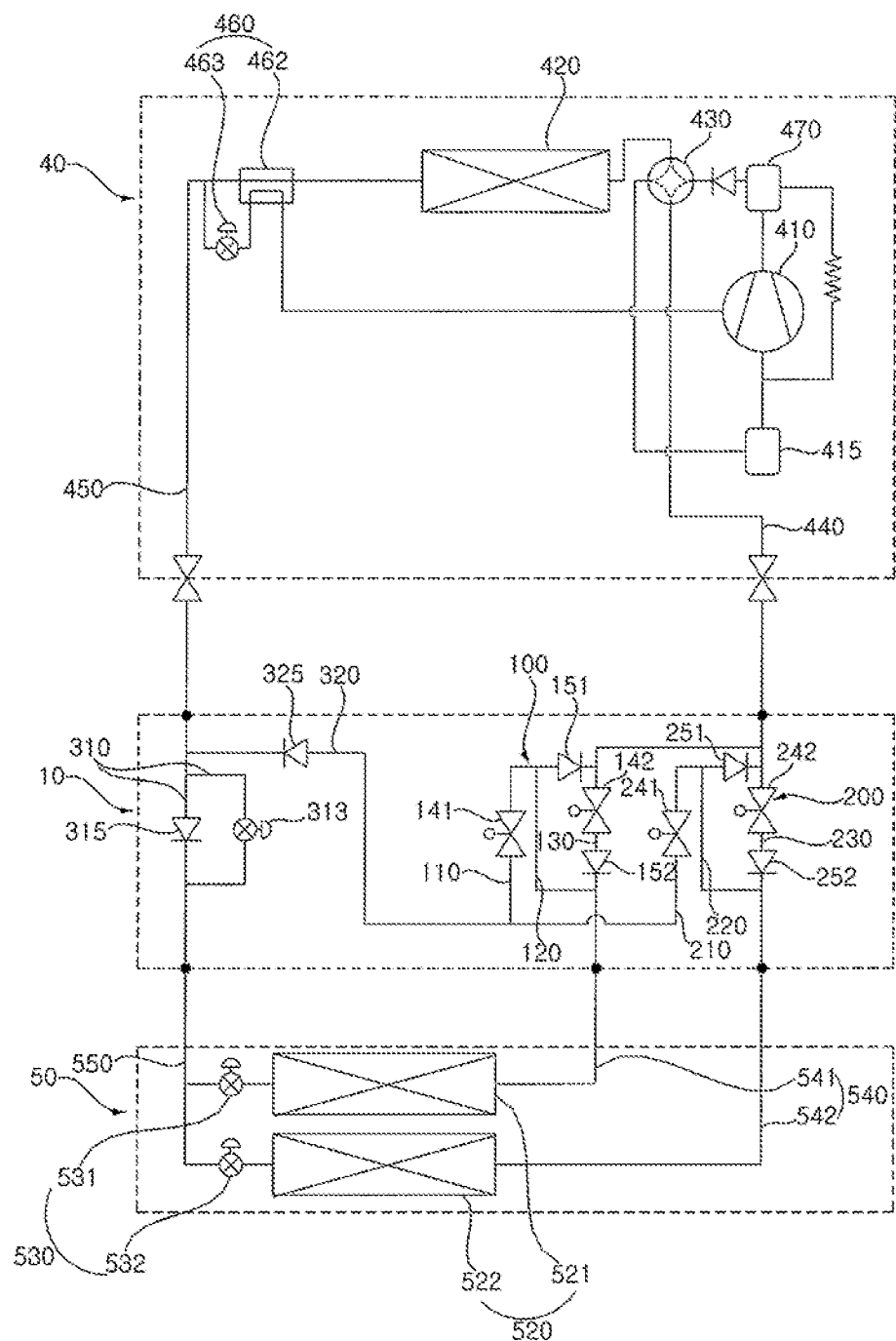
FIG. 1 is a configuration diagram illustrating an air conditioner according to an embodiment of the present disclosure.

FIG. 1 is a configuration diagram illustrating an air conditioner according to an embodiment of the present disclosure.

Referring to FIG. 1, an air conditioner according to an embodiment of the present disclosure includes an outdoor unit 40 installed outdoors and exchanging outdoor air and a refrigerant, an indoor unit 50 installed indoors and exchanging indoor air and a refrigerant, and a continuous refrigeration apparatus 10 for connecting an outdoor unit liquid pipe 450 (hereinafter, also referred to as liquid pipe of outdoor unit) and an indoor unit liquid pipe 550 (hereinafter, also referred to as liquid pipe of indoor unit), and connecting an outdoor unit gas pipe 440 (hereinafter, also referred to as gas pipe of outdoor unit) and an indoor unit gas pipe 540 (hereinafter, also referred to as gas pipe of indoor unit).

An air conditioner according to an embodiment of the present disclosure may be an air conditioner installed in a low temperature warehouse to control a temperature in a warehouse. The low temperature warehouse may store food and the like that should be maintained at a low temperature.

The indoor unit 50 may be installed inside the low temperature warehouse to provide cold air to the warehouse. The outdoor unit 40 may be installed outside the low temperature warehouse. The continuous refrigeration apparatus 10 may be installed to connect the outdoor unit 40 and the indoor unit 50, and may be installed near the indoor unit 50.

Meanwhile, the air conditioner according to an embodiment of the present disclosure may include a controller 60 for controlling the air conditioner as described below. Hereinafter, it can be understood that the operation of a four-way valve 430, a solenoid valve 141, 142, 241, 242, an expansion valve 530, 313, and the like are controlled by the controller 60.

The outdoor unit 40 of the air conditioner according to an embodiment of the present disclosure includes a compressor 410 for compressing a refrigerant, and an outdoor heat exchanger 420 for heat-exchanging outdoor air with the refrigerant. In addition, the outdoor unit 40 includes an outdoor unit gas pipe 440 connected to the compressor 410 and an outdoor unit liquid pipe 450 connected to the outdoor heat exchanger 420.

The compressor 410 compresses the low temperature, low pressure vapor refrigerant introduced through an inlet flow path of the compressor 410 into the high temperature, high pressure vapor refrigerant. As described below, the inlet flow path of the compressor 410 may be connected to an accumulator 415, and an outlet flow path of the compressor 410 may be connected to an oil separator 470.

The outdoor heat exchanger 420 may be connected to an outlet flow path of the compressor 410 during the refrigeration operation and may serve as a condenser. The outdoor heat exchanger 420 receives a high-temperature, high-pressure vapor refrigerant discharged from the compressor 410 during the refrigeration operation, heat-exchanges the refrigerant with the outdoor air, and discharges the high-temperature, high-pressure liquid refrigerant. The outdoor heat exchanger 420 emits heat to the outdoor space while the refrigerant is condensed.

The outdoor heat exchanger 420 may be connected to the inlet flow path of the compressor 410 during the defrosting operation to serve as an evaporator. The outdoor heat exchanger 420 receives the low-temperature, low-pressure two-phase refrigerant that is discharged from the indoor unit 50 and flowed into the outdoor unit liquid pipe 450 during the defrosting operation, heat-exchanges the refrigerant with outdoor air, and discharges the low-temperature low-pressure vapor refrigerant. The outdoor heat exchanger 420 absorbs heat of the outdoor space while the refrigerant evaporates.

The outdoor unit 40 may include a pair of refrigerant pipes. The pair of refrigerant pipes may include an outdoor unit gas pipe 440 through which a vapor refrigerant or a high dry two-phase refrigerant flows, and an outdoor unit liquid pipe 450 through which a liquid refrigerant or a low dry two-phase refrigerant flows.

The outdoor unit gas pipe 440 may be connected to the indoor unit gas pipe 540 through a gas control unit 100, 200 of the continuous refrigeration apparatus 10. The outdoor unit gas pipe 440 may be connected to the inlet flow path of the compressor 410 and guide the low-temperature, low-pressure vapor refrigerant to the compressor 410 during the refrigeration operation. The outdoor unit gas pipe 440 may be connected to the outlet flow path of the compressor 410, and guide the high temperature and high pressure vapor refrigerant discharged from the compressor 410 to the gas control unit 100, 200 of the continuous refrigeration apparatus 10 during the defrosting operation.

The outdoor unit liquid pipe 450 may be connected to the indoor unit liquid pipe 550 through a first pipe 310 of the continuous refrigeration apparatus 10. The outdoor unit liquid pipe 450 may be connected to the outdoor heat exchanger 420. The outdoor unit liquid pipe 450 may guide the high temperature, high pressure liquid refrigerant discharged from the outdoor heat exchanger 420 to the first pipe 310 during the refrigeration operation, and guide the low dry two-phase refrigerant of low temperature, low pressure to the outdoor heat exchanger 420 during the defrosting operation.

Meanwhile, the outdoor unit 40 may further include a four-way valve 430 for selectively guiding the refrigerant discharged from the compressor 410 to the outdoor heat exchanger 420 or the indoor heat exchanger 520, an accumulator 415 disposed between the four-way valve 430 and the inlet flow path of the compressor 410 and providing the vapor refrigerant to the compressor 410, a supercooler 460 for supercooling the refrigerant discharged from the outdoor heat exchanger 420, and an oil separator 470 separating oil from the refrigerant discharged from the compressor 410. In addition, the outdoor unit may further include an outdoor blower fan (not shown) disposed in one side of the outdoor heat exchanger, and the outdoor blower fan may improve the heat exchange performance of the outdoor heat exchanger 420 by flowing the outdoor air.

The four-way valve 430 may be connected to the outlet flow path of the compressor 410, and the inlet flow path of an indoor heat exchanger 520, the outdoor unit gas pipe 440, and the compressor 410. The four-way valve 430 may connect the outlet flow path of the compressor 410 and the outdoor heat exchanger 420 to guide the refrigerant discharged from the compressor 410 to the outdoor heat exchanger 420, and connect the gas pipe of the outdoor unit 440 and the inlet flow path of the compressor 410 to guide the refrigerant introduced into the outdoor unit 40 to the compressor 410 during the refrigeration operation. The four-way valve 430 may connect the outlet flow path of the compressor 410 and the gas pipe 440 of the outdoor unit and guide the refrigerant discharged from the compressor 410 to the gas pipe 440 of the outdoor unit, and connect the outdoor heat exchanger 420 and the inlet flow path of the compressor 410 and guide the refrigerant discharged from the outdoor heat exchanger 420 to the compressor 410 during the defrosting operation.

Meanwhile, the above-mentioned refrigeration operation means a case where all of the plurality of indoor heat exchangers 520 provided in the indoor unit 50 serve as an evaporator to absorb heat in the indoor space, and the above-mentioned defrosting operation means a case where at least one of the plurality of indoor heat exchangers 520 provided in the indoor unit 50 serves as a condenser to remove frost formed in the indoor heat exchanger 520.

Therefore, the four-way valve 430 guides the refrigerant discharged from the compressor 410 to the outdoor heat exchanger 420 during the refrigeration operation of all the plurality of indoor heat exchangers 520, and may guide the refrigerant discharged from the compressor 410 to the gas pipe 440 of the outdoor unit during the defrosting operation of at least one of the plurality of indoor heat exchangers 520.

Meanwhile, the controller 60 may control the four-way valve 430 to switch the refrigerant flow path. During the refrigeration operation, under the control of the controller 60, the four-way valve 430 may connect the outlet flow path of the compressor 410 and the outdoor heat exchanger 420 and may connect the inlet flow path of the compressor 410 and the gas pipe 440 of the outdoor unit. During the defrosting operation, under the control of the controller 60, the four-way valve 430 may connect the outlet flow path of the compressor 410 and the gas pipe 440 of the outdoor unit, and may connect the inlet flow path of the compressor 410 and the outdoor heat exchanger 420.

The accumulator 415 may be installed between the inlet flow path of the compressor 410 and the four-way valve 430. The refrigerant introduced into the gas pipe 440 of the outdoor unit through the gas control unit 100, 200 of the continuous refrigeration apparatus 10 during the refrigeration operation and/or the refrigerant discharged from the outdoor heat exchanger 420 during the defrosting operation may not reach a saturated liquid state, but may be in a two-phase liquid-gas state. The accumulator 415 may be disposed upstream of the compressor 410, and may be connected to the inlet flow path of the compressor 410 and separate the two-phase refrigerant into vapor state and liquid state refrigerants, and supply the vapor state refrigerant to the compressor 410.

The oil separator 470 may be installed between the outlet flow path of the compressor 410 and the four-way valve 430. The oil separator 470 may separate oil from the compressed refrigerant discharged from the compressor 410, guide the refrigerant to the four-way valve 430, and guide the oil to the inlet flow path of the compressor 410.

The supercooler 460 may be installed between the outdoor heat exchanger 420 and the outdoor unit liquid pipe 450. The supercooler 460 may supercool the refrigerant condensed from the outdoor heat exchanger 420 during the refrigeration operation. The supercooler 460 may include a supercooling heat exchanger 462 and a supercooling expansion valve 463.

The refrigerant discharged from the outdoor heat exchanger 420 flows into the supercooling heat exchanger 462, and a part of the refrigerant flown into the supercooling heat exchanger 462 flows along the outdoor unit liquid pipe 450, and the remaining part of the refrigerant may be expanded while passing through the supercooling expansion valve 463. The refrigerant that is discharged from the outdoor heat exchanger 420 and introduced into the supercooling heat exchanger 462 and the refrigerant that is expanded through the supercooling expansion valve 463 may exchange heat with each other. The refrigerant that is discharged from the outdoor heat exchanger 420 and introduced into the supercooling heat exchanger 462 may be supercooled, and the refrigerant discharged from the supercooling expansion valve 463 and introduced into the supercooling heat exchanger 462 may be introduced into an intermediate pressure stage of the compressor 410 after heat exchange.

The indoor unit 50 of the air conditioner according to the embodiment of the present disclosure includes a plurality of indoor heat exchangers 520 for heat-exchanging indoor air and refrigerant, and an indoor expansion valve 530 connected to the plurality of indoor heat exchangers and expanding the refrigerant. In addition, the indoor unit 50 includes a plurality of indoor unit gas pipes 540 connected to one end of the plurality of indoor heat exchangers 520 respectively, and an indoor unit liquid pipe 550 connected to the other end of the plurality of indoor heat exchangers 520.

The plurality of indoor heat exchangers 520 include two or more indoor heat exchangers, and include a first indoor heat exchanger 521 and a second indoor heat exchanger 522.

One end of the plurality of indoor heat exchangers 520 is connected to the plurality of indoor unit gas pipes 540 respectively, and the plurality of indoor unit gas pipes 540 are connected to a plurality of gas control units 100 and 200 respectively. The other end of the plurality of indoor heat exchangers 520 are connected to the indoor expansion valve 530, and the indoor expansion valve 530 is connected to the indoor unit liquid pipe 550.

Figure 3:
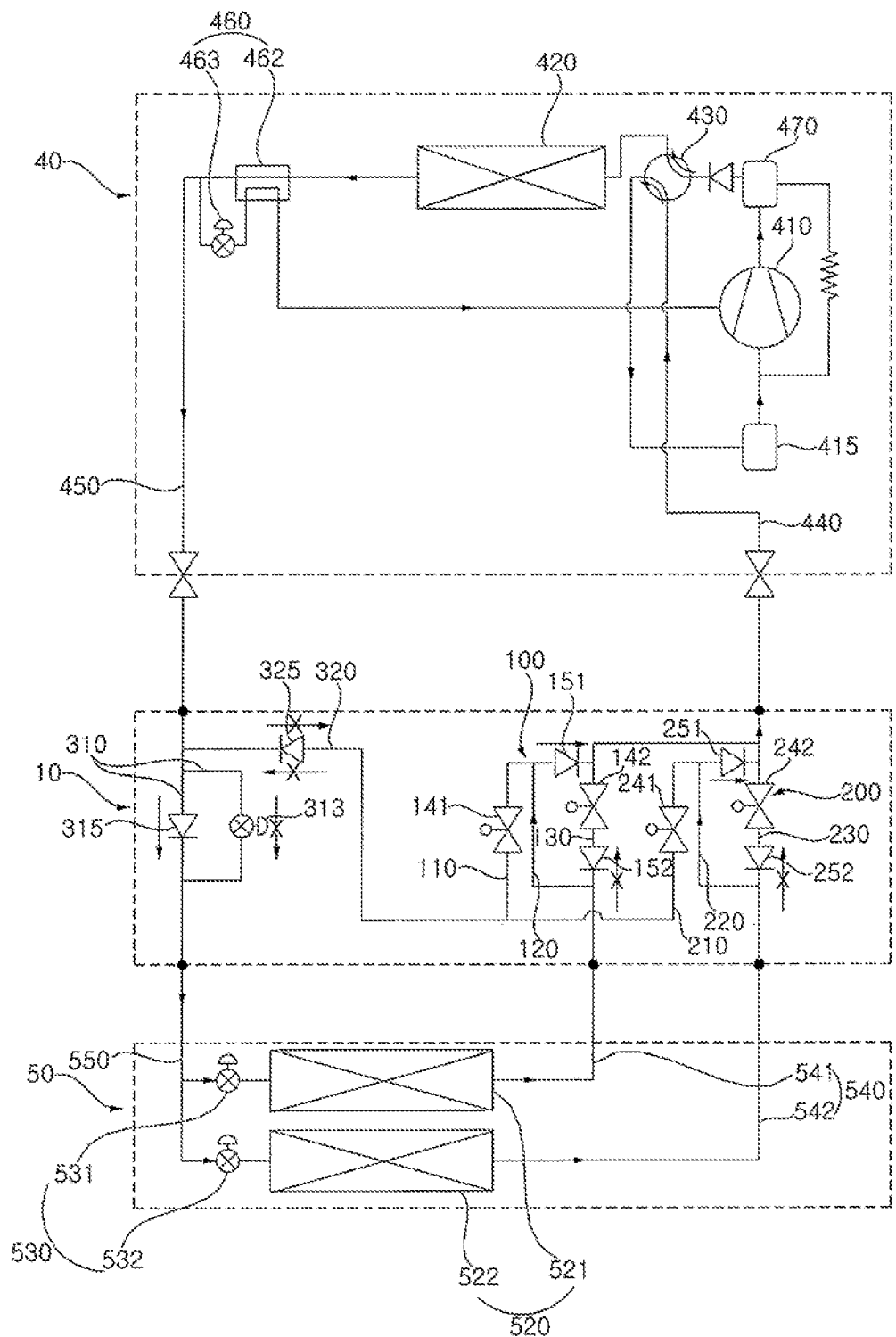
FIG. 3 is a configuration diagram illustrating a refrigerant flow during a refrigeration operation of all the indoor heat exchanger of an air conditioner according to an embodiment of the present disclosure.
Figure 4:
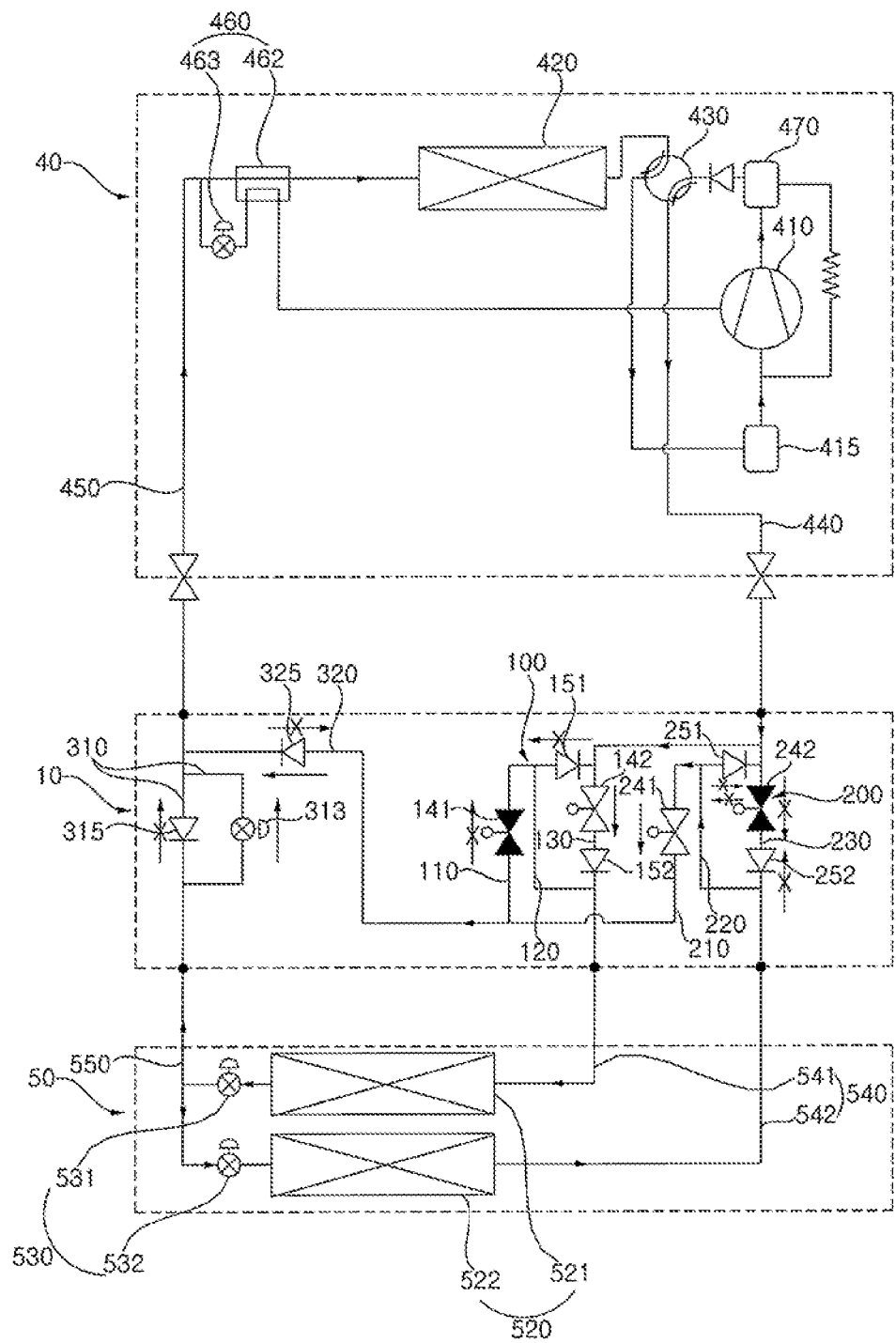
FIG. 4 is a configuration diagram illustrating a refrigerant flow when a first indoor heat exchanger of an air conditioner performs a defrosting operation, and a second indoor heat exchanger performs a refrigeration operation according to an embodiment of the present disclosure.

FIG. 1, FIG. 3, and FIG. 4 illustrate an air conditioner having two indoor heat exchangers 520, but may include three or more indoor heat exchangers 520. In the case of three or more indoor heat exchanger 520, the indoor expansion valve 530, the gas control unit 100, 200, and the gas pipe 540 of the indoor heat exchanger may also be provided in three or more. In addition, the flow of the refrigerant, the configuration of the gas control unit 100, 200, and the control of the expansion valves 530, 313 and the solenoid valve 141, 142, 241, 242 are the same as or similar to those of the two indoor heat exchangers 520. Therefore, hereinafter, a case in which two indoor heat exchangers 520 are provided will be described as an example, and thus, a case in which three or more indoor heat exchangers 520 are provided can be fully understood even if the detailed description is omitted.

One end of the first indoor heat exchanger 521 is connected to a gas pipe 541 of the first indoor heat exchanger, and the gas pipe 541 of the first indoor heat exchanger is connected to the first gas control unit 100. The other end of the first indoor heat exchanger 521 is connected to a first indoor expansion valve 531, and the first indoor expansion valve 531 is connected to the indoor unit liquid pipe 550.

One end of the second indoor heat exchanger 522 is connected to a gas pipe 542 of the second indoor heat exchanger, and the gas pipe 542 of the second indoor heat exchanger is connected to the second gas control unit 200. The other end of the second indoor heat exchanger 522 is connected to a second indoor expansion valve 532, and the second indoor expansion valve 532 is connected to the indoor unit liquid pipe 550.

The indoor heat exchanger 520 heat-exchanges the refrigerant introduced in the two-phase state of low temperature, low pressure with indoor air to evaporate in the vapor state of low temperature, low pressure during the refrigeration operation, and heat-exchanges the refrigerant introduced in the high temperature, high pressure vapor state with indoor air to condense into liquid state of high temperature, high pressure during the defrosting operation.

During the refrigeration operation of all the plurality of indoor heat exchangers 520, the refrigerant introduced into the liquid pipe 550 of the indoor unit is expanded through the indoor expansion valve 530, evaporated in the indoor heat exchanger 520, and is discharged to the continuous refrigeration apparatus 10 through the gas pipe 540 of the indoor unit.

In the refrigeration operation of the first indoor heat exchanger 521 and the defrosting operation of the second indoor heat exchanger 522, the refrigerant discharged from the compressor 410 passes through the second indoor heat exchanger 522 through the second gas control unit 200 in a vapor state of high temperature and high pressure to remove the frost, a part of the refrigerant discharged from the second indoor heat exchanger 522 flows to the first pipe 310 of the continuous refrigeration apparatus 10 through the indoor unit liquid pipe 550, and the remaining part is expanded while passing through the first indoor expansion valve 531, and flows through the first indoor heat exchanger 521 and is expanded by heat-exchanging with the indoor air.

In the defrosting operation of the first indoor heat exchanger 521 and the refrigeration operation of the second indoor heat exchanger 522, the refrigerant discharged from the compressor 410 passes through the first indoor heat exchanger 521 through the first gas control unit 100 in a vapor state of high temperature, high pressure to remove frost, a part of the refrigerant discharged from the first indoor heat exchanger 521 flows to the first pipe 310 of the continuous refrigeration apparatus 10 through the indoor unit liquid pipe 550, and the remaining part is expanded through the second indoor expansion valve 532, flows through the second indoor heat exchanger 522 and is expanded by heat exchanging with the indoor air.

The Indoor unit 50 may include a plurality of indoor blower fans (not shown) respectively provided in one side of the plurality of indoor heat exchangers 520. The indoor blower fan may be operated during the refrigeration operation and may be stopped during the defrosting operation.

More specifically, during the refrigeration operation of all the plurality of indoor heat exchangers 520, all the indoor blower fans may be operated. In addition, in the defrosting operation of the first indoor heat exchanger 521 and the refrigeration operation of the second indoor heat exchanger 522, the indoor blower fan provided in the first indoor heat exchanger 521 may be stopped, and the indoor blower fan provided in the second indoor heat exchanger 522 may be operated. During the refrigeration operation of the first indoor heat exchanger 521 and the defrosting operation of the second indoor heat exchanger 522, the indoor blower fan provided in the first indoor heat exchanger 521 is operated and the blower fan provided in the second indoor heat exchanger 522 is stopped.

Therefore, among the plurality of indoor heat exchangers 520, the indoor heat exchanger 520 operated in the refrigeration operation provides cold air to the indoor space by the operation of the indoor blower fan, and the indoor heat exchanger 520 operated in the defrosting operation removes the frost formed by stopping the operation of the blower fan, and may minimize the transfer of the heat, which is emitted as the refrigerant is condensed, to the indoor.

The indoor expansion valve 530 may be installed between the plurality of indoor heat exchangers 520 and the liquid pipe 550 of the indoor unit. A first indoor expansion valve 531 may be installed in a flow path connecting the first indoor heat exchanger 521 and the indoor unit liquid pipe 550, and a second indoor expansion valve 532 may be installed in a flow path connecting the second indoor heat exchanger 522 and the indoor unit liquid pipe 550. The indoor expansion valve 530 may be an electronic expansion valve (EEV).

The flow path of the indoor unit liquid pipe 550 side of the first indoor heat exchanger 521 and the second indoor heat exchanger 522 may be converged with the indoor unit liquid pipe 550, the outdoor unit liquid pipe 450 may be connected to the first pipe 310 of the continuous refrigeration apparatus 10, and the first pipe 310 may be connected to the outdoor unit liquid pipe 450.

The indoor expansion valve 530 adjusts the opening degree during the refrigeration operation of the indoor heat exchanger 520 to expand the condensed refrigerant of high temperature, high pressure into a state of low temperature, low pressure two phase refrigerant, and guide the refrigerant to the indoor heat exchanger. The indoor expansion valve may be fully opened during the refrigeration operation of the indoor heat exchanger 520 and guide the refrigerant discharged from the indoor heat exchanger to the outdoor unit liquid pipe 450 without pressure drop.

The first indoor expansion valve 531 may adjust the opening degree during the refrigeration operation of the first indoor heat exchanger 521 and expand the condensed refrigerant of high temperature, high pressure into a two-phase state of low temperature, low pressure, and guide the refrigerant to the first indoor heat exchanger 521. The first indoor expansion valve 531 may be fully opened during the defrosting operation of the first indoor heat exchanger 521 and guide the refrigerant discharged from the first indoor heat exchanger 521 to the outdoor unit liquid pipe 450 without pressure drop.

The second indoor expansion valve 532 may adjust the opening degree during the refrigeration operation of the second indoor heat exchanger 522 and expand the condensed refrigerant of high temperature, high pressure into a two-phase state of low temperature, low pressure, and guide the refrigerant to the second indoor heat exchanger 522. The second indoor expansion valve 532 may be fully opened during the defrosting operation of the second indoor heat exchanger 522 and guide the refrigerant discharged from the second indoor heat exchanger 522 to the outdoor unit liquid pipe 450 without pressure drop.

More specifically, in the refrigeration operation of all the plurality of indoor heat exchangers 520, the first indoor expansion valve 531 and the second indoor expansion valve 532 may adjust the opening degree and expand the high-temperature, high-pressure condensed refrigerant introduced into the outdoor unit liquid pipe 450 from the first pipe 310 to a low-temperature, low-pressure two-phase state, and may guide to the first indoor heat exchanger 521 and the second indoor heat exchanger 522 respectively.

In addition, during the defrosting operation of the first indoor heat exchanger 521 and the refrigeration operation of the second indoor heat exchanger 522, the first indoor expansion valve 531 may be fully opened, and the second indoor expansion valve 532 may adjust the degree of opening to expand the flowing refrigerant. In this case, the refrigerant flowing into the indoor unit 50 flows into the gas pipe 541 of the first indoor heat exchanger from the first gas control unit 100, passes through the first indoor heat exchanger 521, removes the frost formed in the first indoor heat exchanger 521, passes through the first indoor expansion valve 531 without the pressure drop, a part of the refrigerant passed through the first indoor expansion valve 531 is guided to the first pipe 310 through the indoor unit liquid pipe 550, and the remaining part is introduced into the second indoor expansion valve 532 through the indoor unit liquid pipe 550. The remaining part of the refrigerant flowing into the second indoor expansion valve 532 is expanded while passing through the second indoor expansion valve 532, flows into the second indoor heat exchanger 522, absorbs heat from the indoor air and is evaporated, and is guided to the second gas control unit 200 through a second indoor heat exchanger gas pipe 542.

On the contrary, in the refrigeration operation of the first indoor heat exchanger 521 and the defrosting operation of the second indoor heat exchanger 522, the first indoor expansion valve 531 expands the flowing refrigerant by adjusting the opening degree, and the second indoor expansion valve 532 may be fully opened. In this case, the refrigerant flowing into the indoor unit 50 flows into the gas pipe 542 of the second indoor heat exchanger from the second gas control unit 200, passes through the second indoor heat exchanger 522, removes the frost formed in the second indoor heat exchanger 522, passes through the second indoor expansion valve 532 without dropping the pressure, a portion of the refrigerant passed through the second indoor expansion valve 532 is guided to the first pipe 310 through the indoor unit liquid pipe 550, and the remaining portion is introduced into the first indoor expansion valve 531 through the indoor unit liquid pipe 550. The remaining refrigerant flowing into the first indoor expansion valve 531 is expanded while passing through the first indoor expansion valve 531, flows into the first indoor heat exchanger 521, absorbs heat from the indoor air and is evaporated, and is guided to the first gas control unit 100 through a first indoor heat exchanger gas pipe 541.

The gas pipe 540 of the indoor unit includes the gas pipe 541 of the first indoor heat exchanger and the gas pipe 542 of the second indoor heat exchanger.

The gas pipe 541 of the first indoor heat exchanger may be connected to one end of the first indoor heat exchanger 521 and may be connected to the first gas control unit 100. The gas pipe 541 of the first indoor heat exchanger may connect the first indoor heat exchanger 521 and the first gas control unit 100.

The gas pipe 542 of the second indoor heat exchanger may be connected to one end of the second indoor heat exchanger 522 and may be connected to the second gas control unit 200. The gas pipe 542 of the second indoor heat exchanger may connect the second indoor heat exchanger 522 and the second gas control unit 200.

The gas pipes 440 of the outdoor unit may be provided in the same number as the number of the plurality of indoor heat exchangers 520, and the plurality of outdoor unit gas pipes 440 may be connected to the plurality of gas control units 100 and 200, respectively. Therefore, when two indoor heat exchangers 520 are provided, the outdoor unit gas pipe 440 is provided with the first indoor heat exchanger gas pipe 541 and the second indoor heat exchanger gas pipe 542, and the two pipes 541 and 542 are connected to the first gas control unit 100 and the second gas control unit 200, respectively.

The indoor unit liquid pipe 550 is connected to the first pipe 310 of the continuous refrigeration apparatus 10, and branched in plural and is connected to a plurality of indoor heat exchangers 520, respectively. As described above, the indoor expansion valve 530 may be installed in each of a plurality of flow paths that are branched from the indoor unit liquid pipe 550 and connected to the plurality of indoor heat exchangers 520.

Therefore, the indoor unit 50 and the continuous refrigeration apparatus 10 may be connected to the continuous refrigeration apparatus 10 through one liquid pipe 550 and a plurality of gas pipes 541, 542 having the same number as the number of the indoor heat exchangers 520. The continuous refrigeration apparatus 10 may be installed closer to the indoor unit 50 side than the outdoor unit 40 side, and the outdoor unit 40 and the continuous refrigeration apparatus 10 may be connected by two pipes 440 and 450 formed of one liquid pipe 450 and one gas pipe 440, so that required number of pipes can be reduced in comparison with a conventional air conditioner having a plurality of indoor heat exchangers 520.

The continuous refrigeration apparatus 10 of the air conditioner according to an embodiment of the present disclosure includes a plurality of gas control units 100, 200 which are connected to the outdoor unit gas pipe 440 and branched and connected to the plurality of indoor unit gas pipes 540 respectively, a first pipe 310 having one end connected to the outdoor unit liquid pipe 450 and the other end connected to the indoor unit liquid pipe 550, and a second pipe 320 for connecting the first pipe 310 and the plurality of gas control units 100 and 200.

One end of the plurality of gas control units 100 and 200 may be converged with each other and connected to the gas pipe 440 of the outdoor unit. The other end of the plurality of gas control units 100 and 200 may be connected to the plurality of indoor heat exchangers 520, respectively.

Each of the plurality of gas control units 100 and 200 includes a first flow path 110, 210 connecting the gas control unit 100, 200 to the second pipe 320, a second flow path 120, 220 which is connected to the first flow path 110, 210 and connects the outdoor unit gas pipe 440 and the indoor unit gas pipe 540, and a third flow path 130, 230 connected in parallel with the second flow path 120, 220.

The plurality of gas control units 100 and 200 may include a first gas control unit 100 connecting the gas pipe 440 of the outdoor unit and the first indoor heat exchanger 521, and a second gas control unit 200 connecting the gas pipe 440 of the outdoor unit and the second indoor heat exchanger 522. The plurality of gas control units 100 and 200 may be provided in the same number as the plurality of indoor heat exchangers 520. The plurality of gas control units 100 and 200 may be converged with each other toward the outdoor unit 40 side, and connected to the outdoor unit gas pipe 440 by a single pipe. The plurality of gas control units 100 and 200 are branched to each other toward the indoor unit 50 side, and are connected to the gas pipes 541 and 542 of the plurality of indoor heat exchangers, respectively.

The first pipe 310 connects the outdoor unit liquid pipe 450 and the liquid pipe 550 of the indoor unit. The first pipe 310 may include two flow paths connected in parallel with each other. A first pipe check valve 315 and a defrost expansion valve 313 may be installed in two flow paths connected in parallel with each other.

In the refrigeration operation of all the plurality of indoor heat exchangers 520, the refrigerant discharged from the outdoor unit liquid pipe 450 flows into the continuous refrigeration apparatus 10 through the first pipe 310, and is discharged toward the indoor unit liquid pipe 550 through the flow path in which the first pipe check valve 315 is installed. As described later, the defrost expansion valve 313 installed in the first pipe 310 may be closed, and a second pipe check valve 325 may block the flow flowing toward the second pipe 320 from the first pipe 310. Therefore, during the refrigeration operation of all the plurality of indoor heat exchangers 520, the refrigerant introduced into the continuous refrigeration apparatus 10 through the liquid pipe 450 of the outdoor unit flows into the liquid pipe 550 of the indoor unit through a flow path of the first pipe 310 provided with the first pipe check valve 315, while the flow flowing through the flow path provided with the defrost expansion valve 313 and the second pipe 320 is blocked.

During the defrosting operation of at least one indoor heat exchanger 520 of the plurality of indoor heat exchangers 520, the refrigerant discharged from the indoor unit liquid pipe 550 is introduced to the continuous refrigeration apparatus 10 through the first pipe 310, flowed toward the indoor unit liquid pipe 550 through the flow path provided with the defrost expansion valve 313, and is expanded while passing through the defrost expansion valve 313. As described later, the defrost expansion valve 313 installed in the first pipe adjusts the opening degree to expand the flowing refrigerant, and the first pipe check valve 315 may block the flow flowing toward the indoor unit 50 from the outdoor unit 40. Therefore, during the defrosting operation of at least one indoor heat exchanger 520 of the plurality of indoor heat exchangers 520, the refrigerant that is introduced into the continuous refrigeration apparatus 10 through the liquid pipe 550 of the indoor unit flows through the flow path provided with the defrost expansion valve 313 and is expanded, and then flows into the liquid pipe 450 of the outdoor unit, while the flow flowing through the flow path provided with the first pipe check valve 315 is blocked.

The second pipe 320 is branched from the first pipe 310 and connected to the plurality of gas control units 100 and 200. The second pipe 320 is connected to the first gas control unit 100 and the second gas control unit 200. When the plurality of indoor heat exchangers 520 include first to third indoor heat exchangers (not shown), the plurality of gas control units 100 and 200 may include first to third gas control units, and the second pipe 320 is connected to the first gas control unit 100, the second gas control unit 200, and a third gas control unit (not shown).

The second pipe 320 may be branched from the first pipe 310 between two parallel connected paths of the first pipe 310 and the outdoor unit side end of the first pipe 310. That is, the second pipe 320 may be branched from the first pipe 310 from the outdoor unit 40 side than the flow path provided with the first pipe check valve 315 and the flow path provided with the defrost expansion valve 313.

A second pipe check valve 325 may be installed in the second pipe 320.

The first flow path 110, 210 may connect the gas control unit 100, 200 to the second pipe 320. One end of the first flow path 110, 210 may be connected to the second flow path 120, 220, and the other end of the first flow path 110, 210 may be connected to the second pipe 320. The first solenoid valve 141, 241 may be installed in the first flow path 110, 210.

The second flow path 120, 220 may connect the indoor unit 50 and the outdoor unit 40. The second flow path 120, 220 may connect the gas pipe 541, 542 of the indoor heat exchanger and the gas pipe 440 of the outdoor unit. One end of the second flow path 120, 220 may be connected to the gas pipe 541, 542 of the indoor heat exchanger. The other end of the second flow path 120, 220 may be connected to the gas pipe 440 of the outdoor unit.

One end of the second flow path 120, 220 of each of the plurality of gas control units 100, 200 may be connected to each gas pipe 541, 542 of the plurality of indoor heat exchangers. The other ends of the second flow paths 120 and 220 of the plurality of gas control units 100 and 200 may be extended and converged, and may connect the plurality of gas control units 100 and 200 to each other. The other ends of the second flow paths 120 and 220 of the plurality of gas control units 100 and 200 may be converged and connected to the gas pipe 440 of the outdoor unit by a single pipe.

A first check valve 151, 251 for blocking refrigerant flow from the outdoor unit 40 toward the indoor unit 50 may be installed in the second flow path 120, 220.

The third flow path 130, 230 may be connected in parallel with the second flow path 120, 220.

The second solenoid valve 142, 242 and a second check valve 152, 252 for blocking refrigerant flow flowing from the indoor unit 50 to the outdoor unit 40 may be installed in the third flow path 130, 230. The second solenoid valve 142, 242 and the second check valve 152, 252 may be connected in parallel with the first check valve 151, 251.

During the refrigeration operation of all the plurality of indoor heat exchangers 520, the refrigerant discharged through the gas pipe 540 of the indoor unit flows into the gas control unit 100, 200 of the continuous refrigeration apparatus 10. The refrigerant introduced into the gas control unit 100, 200 may flow into the outdoor unit 40 through the second flow path 120, 220.

In the refrigeration operation of all the plurality of indoor heat exchangers 520, the refrigerant discharged through the gas pipes 541 and 542 of the plurality of indoor heat exchangers is introduced into the plurality of gas control units 100 and 200, respectively. The refrigerant introduced into the plurality of gas control units 100 and 200 may flow through the second flow path 120, 220 of each of the plurality of the gas control units 100 and 200, and may be converged and flow into the outdoor unit 40 through the gas pipe 440 of the outdoor unit, while the flow toward the third flow path 130, 230 is blocked by the second check valve 152, 252.

When some of the indoor heat exchangers 520 are in a refrigeration operation and the remaining indoor heat exchangers 520 are in a defrosting operation, and the refrigerant discharged from the gas pipe 440 of the outdoor unit flows into the gas control unit 100 and 200 connected to the indoor heat exchanger 520 which is in a defrosting operation, and flows into the gas pipe 540 of the indoor heat exchanger which is defrosted through the third flow path 130, 230. A part of the refrigerant introduced into the indoor heat exchanger 520 which is in a defrosting operation flows into the indoor heat exchanger 520 that is in a refrigeration operation, and the remaining part of the refrigerant flows into the first pipe 310 through the liquid pipe 550 of the indoor unit. The refrigerant flowing into the indoor heat exchanger 520 that is in a refrigeration operation flows to the gas control unit 100, 200 connected to the indoor heat exchanger 520 that is in a refrigeration operation, and flows through the second flow path 120, 220, the first flow path 110, 210, and the second pipe 320.

In the defrosting operation of all of the plurality of indoor heat exchangers 520, the refrigerant discharged from the outdoor unit gas pipe 440 flows into the plurality of gas control units 100 and 200, and flows into the gas control unit 100, 200 of the plurality of indoor heat exchangers through the third flow path 130, 230 of the plurality of gas control units 100 and 200.

Each of the plurality of gas control units 100 and 200 may include a first solenoid valve 141, 241 installed in the first flow path 110, 210 and controlling the flow of the refrigerant, a first check valve 151, 251 installed in the second flow path 120, 220, blocking the flowing of the refrigerant, which is introduced into the gas control unit from the gas pipe of the outdoor unit, toward the first flow path 110, 210 and the second flow path 120, 220, and guiding the refrigerant toward the third flow path, and a second solenoid valve 142, 242 installed in the third flow path 130, 230 and controlling the flow of the refrigerant flowing through the third flow path.

A solenoid valve includes a two-way solenoid valve that, when closed, blocks two-way flow, and a one-way solenoid valve that blocks only desired one way flow and cannot block the opposite flow. The one-way solenoid valve is closed to prevent the flow of the refrigerant, and there is a risk of breakage when there is flow in the opposite direction. The two-way solenoid valve is complex in configuration, and is expensive.

Accordingly, the first solenoid valve 141, 241 and the second solenoid valve 142, 242 may be a solenoid valve for blocking only one way flow, and the first and second check valves 151, 152, 251, 252 may be installed in one side of the first and second solenoid valves 141, 142, 241 and 242.

When the first solenoid valve 141, 241 is closed, it may block the flow flowing from the second flow path 120, 220 toward the second pipe 320. Therefore, when the high pressure refrigerant discharged from the compressor 410 flows into the gas control unit 100, 200, the refrigerant flows through the third flow path 130, 230, and may block the flow to the second pipe 320 through the second flow path 120, 220 and the first flow path 110, 210.

In addition, when the first solenoid valve 141 and 241 is closed, a high pressure refrigerant introduced into the first flow path 110, 210 through the second flow path 120, 220 from the third flow path 130, 230 may exist in one end of the first solenoid valve 141, 241, and a low pressure refrigerant introduced into the first flow path 110, 210 from the second pipe 320 may exist in the other end of the first solenoid valve 141, 241. In the case of the refrigerant positioned in both ends of the first solenoid valve 141, 241 respectively, the flow flowing from the second flow path 120, 220 to the second pipe 320 is blocked as the first solenoid valve 141, 241 is closed. Further, the flow flowing toward the second flow path 120, 220 through the first flow path 110, 210 in the second pipe 320 may also be blocked due to a pressure difference between the both ends of the first solenoid valve 141, 241.

Meanwhile, the first flow path 110, 210 may further include a third check valve (not shown), which is formed between a converging point of the first flow path 110, 210 and the second pipe 320, and the first solenoid valve 141, 241, that blocks the flow flowing toward the first flow path 110, 210 from the second pipe 320.

Alternatively, when closed, the first solenoid valve 141, 241 may be a solenoid valve that blocks the two way flow.

The gas control unit 100, 200 may include the second check valve 152, 252 which is installed in the third flow path 130, 230, and blocks the flow flowing from the indoor unit to the outdoor unit through the third flow path 130, 230. The second solenoid valve 142, 242 may be a solenoid valve that blocks a one way flow, and when closed, may block the flow flowing from the indoor unit 50 toward the outdoor unit 40.

When the second solenoid valve 142, 242 is opened, the refrigerant introduced into the continuous refrigeration apparatus 10 from the outdoor unit 40 may flow toward the gas pipe 540 of the indoor unit through the third flow path 130, 230. When the second solenoid valve 142, 242 is closed, the flow flowing from the outdoor unit 40 toward the indoor unit 50 through the third flow path 130, 230 may be blocked.

In the refrigerant which is introduced into the continuous refrigeration apparatus 10 through the gas pipe 540 of the indoor unit, the flowing toward the outdoor unit 40 through the third flow path 130, 230 may be blocked by the second check valve 152, 252.

Meanwhile, the plurality of gas control units 100 and 200 may include a first gas control unit 100 connected to the first indoor heat exchanger 521 and a second gas control unit 200 connected to the second indoor heat exchanger 522. One end of the first gas control unit 100 and one end of the second gas control unit 200 may be converged to be connected to the gas pipe 440 of the outdoor unit. The other end of the first gas control unit 100 may be connected to the first indoor heat exchanger 521, and the other end of the second gas control unit 200 may be connected to the second indoor heat exchanger 522.

The first gas control unit 100 may include a first-first flow path 110 connecting the first gas control unit 100 to the second pipe 320, a first-second flow path 120 connected to the first-first flow path 110 and circulating a refrigerant discharged from the first indoor heat exchanger 521 during the refrigeration operation of the first indoor heat exchanger 521, and a first-third flow path 130 connected in parallel with the first-second flow path 120 and guiding the refrigerant discharged from the compressor 410 to the first indoor heat exchanger 521 during the defrosting operation of the first indoor heat exchanger 521.

That is, among the configuration of the first gas control unit 100, the first flow path 110 may be referred to as the first-first flow path 110, the second flow path 120 may be referred to as the first-second flow path 120, and the third flow path 130 may be referred to as the first-third flow path 130. In addition, among the configuration of the first gas control unit 100, the first solenoid valve 141 may be referred to as a first-first solenoid valve 141, the second solenoid valve 142 as a first-second solenoid valve 142, the first check valve 151 as a first-first check valve 151, and the second check valve 152 as a first-second check valve 152.

The first-first solenoid valve 141 is provided in the first-first flow path 110 and may adjust the flow of the refrigerant flowing through the first-first flow path 110. The first-first solenoid valve 141 may be opened during the refrigeration operation of the first indoor heat exchanger 521, and closed during the defrosting operation of the first indoor heat exchanger 521.

The first-second solenoid valve 142 may be installed in the first-third flow path 130 and adjust the flow of the refrigerant flowing through the first-third flow path 130. The first-second solenoid valve 142 may be opened during the defrosting operation of the first indoor heat exchanger 521, and may be closed during the refrigeration operation of the first indoor heat exchanger 521 and the defrosting operation of the second indoor heat exchanger 522.

The first-first check valve 151 may be installed in the first-second flow path 120, and may block the flow, toward first-first flow path 110 and the first-second flow path 120, of the refrigerant introduced into the first gas control unit 100 from the gas pipe 440 of the outdoor unit, and guide the refrigerant toward the first-third flow path 130.

The first-second check valve 152 may be installed in the first-third flow path 130, and may block the flow of the refrigerant, which is introduced into the first gas control unit 100 from the first indoor heat exchanger 521, flowing through the first-third flow path 130, and guide the refrigerant toward the first-second flow path 120.

The second gas control unit 200 may include a second-first flow path 210 connecting the second gas control unit 200 to the second pipe 320, a second-second flow path 220 which is connected to the second-first flow path 210 and in which the refrigerant discharged from the second indoor heat exchanger 522 flows during the refrigeration operation of the second indoor heat exchanger 522, and a second-third flow path 230 connected in parallel with the second-second flow path 220 and guiding the refrigerant discharged from the compressor 410 to the second indoor heat exchanger 522 during the defrosting operation of the second indoor heat exchanger 522.

That is, among the configuration of the second gas control unit 200, the first flow path 210 is referred to as a second-first flow path 210, the second flow path 220 is referred to as a second-second flow path 220, and the third flow path 230 is referred to as a second-third flow path 230. In addition, among the configuration of the second gas control unit 200, the first solenoid valve 241 is referred to as a second-first solenoid valve 241, the second solenoid valve 242 as a second-second solenoid valve 242, the first check valve 251 as a second-first check valve 251, and the second check valve 252 as a second-second check valve 252.

The second-first solenoid valve 241 may be installed in the second-first flow path 210, and may adjust the flow of the refrigerant flowing through the second-first flow path 210. The second-first solenoid valve 241 may be opened during the refrigeration operation of the second indoor heat exchanger 522 and may be closed during the defrosting operation of the second indoor heat exchanger 522.

The second-second solenoid valve 242 may be installed in the second-third flow path 230, and may adjust the flow of the refrigerant flowing through the second-third flow path 230. The second-second solenoid valve 242 may be opened during the defrosting operation of the second indoor heat exchanger 522, and may be closed during the defrosting operation of the first indoor heat exchanger 521 and the refrigeration operation of the second indoor heat exchanger 522.

The second-first check valve 251 may be installed in the second-second flow path 220, and may block the flow, toward second-first flow path 210 and the second-second flow path 220, of the refrigerant introduced into the second gas control unit 200 from the gas pipe 440 of the outdoor unit, and guide the refrigerant toward the second-third flow path 230.

The second-second check valve 252 may be installed in the second-third flow path 230, and may block the flow of the refrigerant, which is introduced into the second gas control unit 200 from the second indoor heat exchanger 522, flowing toward the second-third flow path 230, and guide the refrigerant toward the second-second flow path 220.

Figure 2:
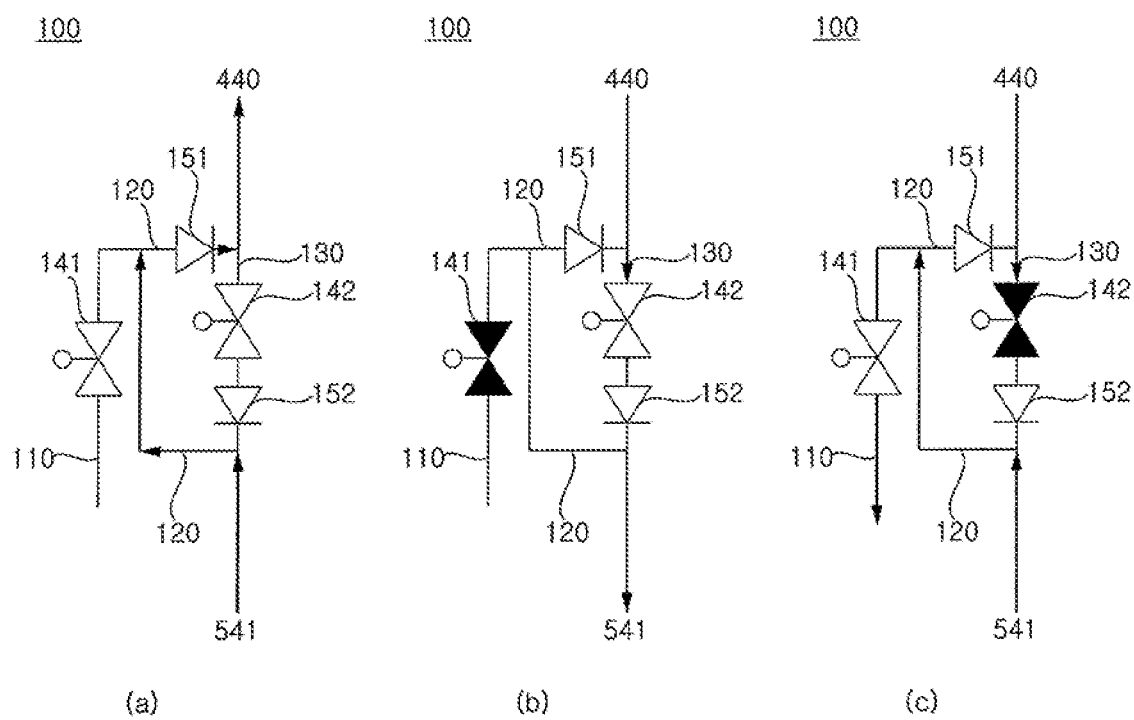
FIG. 2 is a configuration diagram illustrating a refrigerant flow of a first gas control unit illustrated in FIG. 1.

FIG. 2 is a configuration diagram illustrating a refrigerant flow of a first gas control unit illustrated in FIG. 1, FIG. 2A is a configuration diagram illustrates a refrigerant flow of a first gas control unit in a refrigeration operation of all of a plurality of indoor heat exchangers, FIG. 2B is a configuration diagram illustrates a refrigerant flow of a first gas control unit in a defrosting operation of a first indoor heat exchanger, and FIG. 2C is a configuration diagram illustrates a refrigerant flow of a first gas control unit in a defrosting operation of a second indoor heat exchanger.

During the refrigeration operation of all the plurality of indoor heat exchangers 520, the four-way valve 430 may guide the refrigerant discharged from the compressor 410 to the outdoor heat exchanger 420. During the refrigeration operation of all the plurality of indoor heat exchangers 520, the four-way valve 430 may connect the outlet flow path of the compressor 410 and the outdoor heat exchanger 420, and may connect the inlet flow path of the compressor 410 and the outdoor unit gas pipe 440.

The four-way valve 430 may guide the refrigerant discharged from the compressor 410 to the gas pipe 440 of the outdoor unit, during the defrosting operation of at least one of the plurality of indoor heat exchangers 520. During the defrosting operation of at least one of the plurality of indoor heat exchangers 520, the four-way valve 430 may connect the outlet flow path of the compressor 410 and the outdoor unit gas pipe 440, and may connect the inlet flow path of the compressor 410 and the outdoor heat exchanger 420.

Referring to FIG. 2A, in the refrigeration operation of all of the plurality of indoor heat exchangers 520, the refrigerant introduced into the first gas control unit 100 from the first indoor heat exchanger 521 flows to the gas pipe 440 of the outdoor unit through the first-second flow path 120.

In the refrigeration operation of all of the plurality of indoor heat exchangers 520, the first-first solenoid valve 141 and the first-second solenoid valve 142 may be opened. When the first-first solenoid valve 141 and/or the first-second solenoid valve 142 are closed, a closed circuit may be formed, and may be damaged by a volume change caused by a change in temperature, pressure, or state of the refrigerant. This phenomenon may be referred to as liquid sealing phenomenon, and the first-first solenoid valve 141 and the first-second solenoid valve 142 may be opened to prevent the liquid sealing phenomenon.

The first-first check valve 151 is installed in the first-second flow path 120, and allows a flow flowing from the indoor unit 50 toward the outdoor unit 40, and blocks a flow flowing from the outdoor unit 40 to the indoor unit 50.

The first-second check valve 152 is installed in the first-third flow path 130, while installed closer to the outdoor unit 40 side than the first-second solenoid valve 142. That is, the first-second check valve 152 and the first-second solenoid valve 142 are installed in the third flow path 130, 230, while the second check valve 152, 252 may be installed close to the outdoor unit 40 side, and the first-second solenoid valve 142 may be installed close to the indoor unit 50 side. The first-second check valve 152 allows a flow flowing from the outdoor unit 40 to the indoor unit 50 through the first-third flow path 130, and blocks a flow flowing from the indoor unit 50 toward the outdoor unit 40 through the first-third flow path 130.

The solenoid valve 241, 242 and the check valve 251, 252 installed in the second gas control unit 200 have the same or similar installation position, installation direction, and control method.

FIG. 2A illustrates the refrigerant flow of the first gas control unit 100 during the refrigeration operation of all the plurality of indoor heat exchangers 520, and also illustrates the refrigerant flow of the second gas control unit 200. That is, the refrigerant introduced into the second gas control unit 200 from the second indoor heat exchanger 522 flows to the gas pipe 440 of the outdoor unit through the second-second flow path 220.

Referring to FIG. 2B, in the defrosting operation of the first indoor heat exchanger 521, the first-first solenoid valve 141 may be closed and the first-second solenoid valve 142 may be opened.

During the defrosting operation of the first indoor heat exchanger 521, the refrigerant introduced into the first gas control unit 100 from the gas pipe 440 of the outdoor unit flows into the gas pipe 541 of the first indoor heat exchanger through the first-three flow path 130 while a flow flowing toward the first-first flow path 110 and the first-second flow path 120 is blocked by the first-second check valve 152.

FIG. 2B illustrates the refrigerant flow of the first gas control unit 100 during the defrosting operation of the first indoor heat exchanger 521, and also illustrates the refrigerant flow of the second gas control unit 200 during the defrosting operation of the second indoor heat exchanger 522. That is, during the defrosting operation of the second indoor heat exchanger 522, the second-first solenoid valve 241 may be closed, and the second-second solenoid valve 242 may be opened, and the refrigerant introduced into the second gas control unit 200 from the gas pipe 440 of the outdoor unit may be introduced into the gas pipe 542 of the second indoor heat exchanger through the second-third flow path 230.

Referring to FIG. 2C, in the refrigeration operation of the first indoor heat exchanger 521 and the defrosting operation of the second indoor heat exchanger 522, the first-first solenoid valve 141 may be opened, and the first-second solenoid valve 142 may be closed.

In the refrigeration operation of the first indoor heat exchanger 521 and the defrosting operation of the second indoor heat exchanger 522, with respect to the refrigerant flowing toward the first gas control unit 100 from the gas pipe 440 of the outdoor unit, the flow flowing toward the first-first flow path 110 and the first-second flow path 120 is blocked by the first-second check valve 152, and the flow flowing toward the first-third flow path 130 is blocked by the first-second solenoid valve 142. That is, the flow of the refrigerant, discharged from the gas pipe 440 of the outdoor unit, toward the first gas control unit 100 is blocked. In this case, as shown in FIG. 2B and as described above, the refrigerant flowing from the gas pipe 440 of the outdoor unit toward the continuous refrigeration apparatus 10 flows into the second gas control unit 200, and flows into the gas pipe 542 of the second indoor heat exchanger through the second-third flow path 230.

In the refrigeration operation of the first indoor heat exchanger 521 and the defrosting operation of the second indoor heat exchanger 522, the refrigerant, which is condensed while passing through the second indoor heat exchanger 522, is expanded in the first indoor expansion valve 531, and is evaporated while passing through the first indoor heat exchanger 521. The refrigerant discharged from the first indoor heat exchanger 521 flows into the first gas control unit 100, and transferred to the second pipe 320 through the first-second flow path 120 and the first-first flow path 110. The refrigerants in both ends of the first-second check valve 152 are not mixed with each other due to the pressure difference between both ends of the first-second check valve 152.

FIG. 2C also illustrates the second gas control unit 200 in the defrosting operation of the first indoor heat exchanger 521 and the refrigeration operation of the second indoor heat exchanger 522. That is, in the defrosting operation of the first indoor heat exchanger 521 and the refrigeration operation of the second indoor heat exchanger 522, the second-first solenoid valve 241 is opened, and the second-second solenoid valve 242 is closed. The refrigerant introduced into the second gas control unit 200 from the gas pipe 542 of the second indoor heat exchanger flows to the second pipe 320 through the second-second flow path 220 and the second-first flow path 210.

The flow of the refrigerant and the valve control of the controller 60 of the air conditioner according to the present disclosure configured as described above are as follows.

Figure 5:
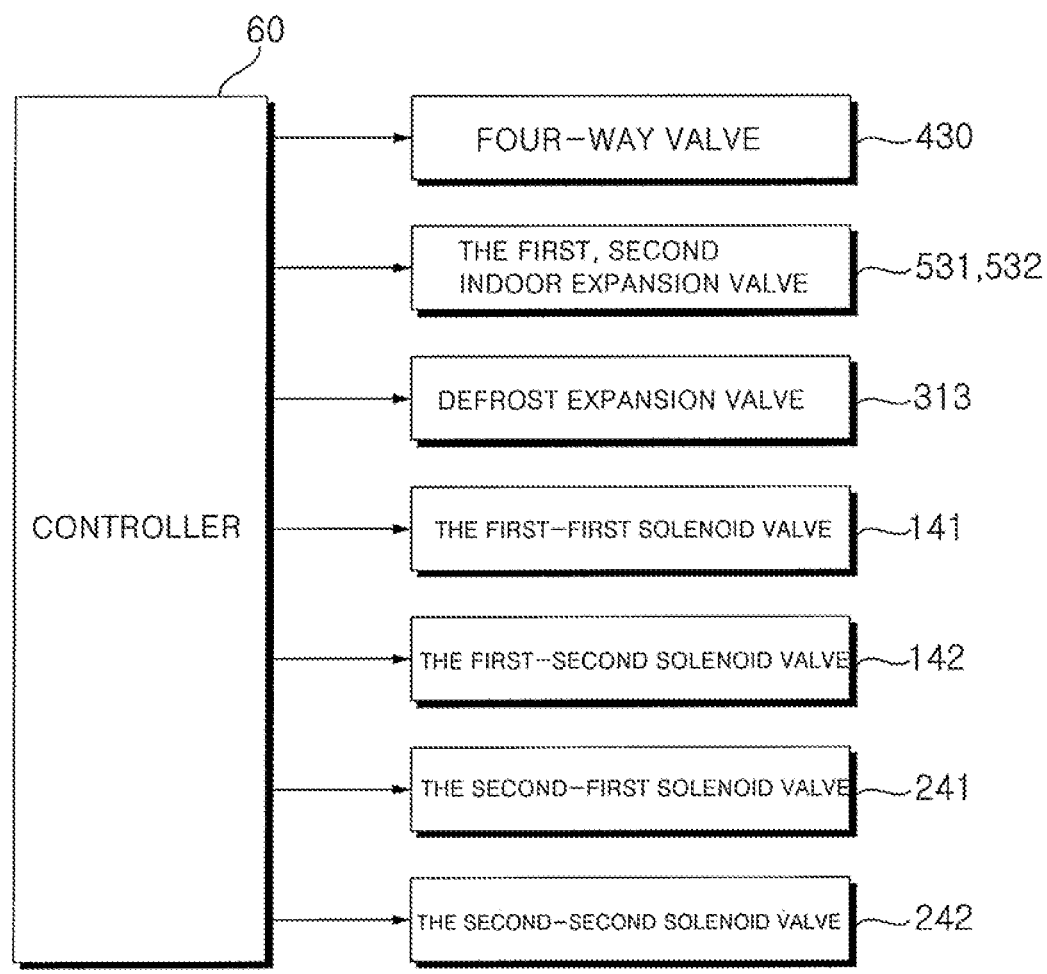
FIG. 5 is a block diagram illustrating a configuration related with a controller of an air conditioner according to an embodiment of the present disclosure.

FIG. 3 is a configuration diagram illustrating a refrigerant flow during a refrigeration operation of all the indoor heat exchanger of an air conditioner according to an embodiment of the present disclosure, FIG. 4 is a configuration diagram illustrating a refrigerant flow when a first indoor heat exchanger of an air conditioner performs a defrosting operation, and a second indoor heat exchanger performs a refrigeration operation according to an embodiment of the present disclosure, and FIG. 5 is a block diagram illustrating a configuration related with a controller of an air conditioner according to an embodiment of the present disclosure.

Referring to FIG. 5, an air conditioner according to an embodiment of the present disclosure may include a controller 60 for controlling the air conditioner. The controller 60 may guide the refrigerant flow by controlling the four-way valve 430, the defrost expansion valve 313, the first indoor expansion valve 531, the second indoor expansion valve 532, the first-first solenoid valve 141, the first-second solenoid valve 142, the second-first solenoid valve 241, and the second-second solenoid valve 242.

Referring to FIGS. 3 and 5, the refrigerant flow of the air conditioner and the valve control of the controller 60 during the refrigeration operation of all the plurality of indoor heat exchangers 520 will be described.

The controller 60 controls the four-way valve 430, connects the outlet flow path (or oil separator 470) of the compressor 410 and the outdoor heat exchanger 420, and connects the inlet flow path (or the accumulator 415) of the compressor 410 and the gas pipe 440 of the outdoor unit. In addition, the controller 60 closes the defrost expansion valve 313, expands the flowing refrigerant by adjusting the opening degree of the first and second indoor expansion valves 530, and opens the first-first solenoid valve 141, the first-second solenoid valve 142, the second-first solenoid valve 241, and the second-second solenoid valve 242.

The refrigerant is compressed into a vapor state of high temperature and high pressure by the compressor 410, and is discharged together with oil. The high temperature and high pressure gas refrigerant and oil discharged from the compressor 410 are introduced into the oil separator 470, and separated from each other, so that the refrigerant is introduced into the four-way valve 430 and the oil is recovered into the inlet flow path of the compressor 410.

The refrigerant discharged from the compressor 410 is guided to the outdoor heat exchanger 420 by the four-way valve 430. The high temperature and high pressure gas refrigerant introduced into the outdoor heat exchanger 420 is heat-exchanged with the outdoor air in the outdoor heat exchanger 420, and condensed and discharged in a liquid state of high temperature and high pressure or in a two-phase state having low dry.

The refrigerant discharged from the outdoor heat exchanger 420 may flow into the supercooling heat exchanger 462, and be supercooled in the supercooling heat exchanger 462. A part of the refrigerant discharged from the supercooling heat exchanger 462 flows to the liquid pipe 450 of the outdoor unit, and the remaining part is expanded while passing through the supercooling expansion valve 463, flows into the supercooling heat exchanger 462, and may exchange heat with the refrigerant discharged from the gas 420 and introduced into the supercooling heat exchanger 462. The refrigerant passed through the supercooling expansion valve 463 and the supercooling heat exchanger 462 may be introduced into an intermediate pressure stage of the compressor 410 and be compressed.

The refrigerant flowing into the liquid pipe 450 of the outdoor unit is introduced into the first pipe 310 of the continuous refrigeration apparatus 10. The refrigerant introduced into the first pipe 310 is introduced into the indoor unit liquid pipe 550 through the flow path in which the first pipe check valve 315 is installed, as a flow flowing toward the second pipe 320 is blocked by the second pipe check valve 325 and the defrost expansion valve 313 is closed.

A part of the refrigerant introduced into the indoor unit liquid pipe 550 passes through the first indoor expansion valve 531 and is expanded to flow into the first indoor heat exchanger 521 in a two-phase state of low temperature and low pressure. The refrigerant introduced into the first indoor heat exchanger 521 is evaporated while exchanging heat with the indoor air, and is introduced into the first gas control unit 100 through the first indoor heat exchanger gas pipe 541.

The remaining portion of the refrigerant introduced into the indoor unit liquid pipe 550 passes through the second indoor expansion valve 532 and is expanded to flow into the second indoor heat exchanger 522 in a two-phase state of low temperature and low pressure. The refrigerant introduced into the second indoor heat exchanger 522 is evaporated while exchanging heat with the indoor air, and is introduced into the second gas control unit 200 through the second indoor heat exchanger gas pipe 542.

The refrigerant introduced into the first gas control unit 100 flows through the first-second flow path 120, and the refrigerant introduced into the second gas control unit 200 flows through the second-second flow path 220. The refrigerant flowing through the first-second flow path 120 and the refrigerant flowing through the second-second flow path 220 are converged to flow to the outdoor unit gas pipe 440 through a single pipe.

The refrigerant introduced into the outdoor unit 40 through the outdoor unit gas pipe 440 is guided to the accumulator 415 by the four-way valve 430, and is supplied in the vapor state to the compressor 410 by the accumulator 415. The vapor refrigerant supplied by the accumulator 415 is supplied to the compressor 410 together with the oil recovered by the oil separator 470.

Therefore, the first indoor heat exchanger 521 and the second indoor heat exchanger 522 may serve as an evaporator, and the outdoor heat exchanger 420 may serve as a condenser.

Referring to FIGS. 4 and 5, the refrigerant flow of the air conditioner and the valve control of the controller 60 during the defrosting operation of at least one of the plurality of indoor heat exchangers 520 will be described.

In the defrosting operation of at least one of the plurality of indoor heat exchangers 520, the controller 60 controls the four-way valve 430 to connect the outlet flow path (or the oil separator 470) of the compressor 410 and the gas pipe 440 of the outdoor unit, and connect the inlet flow path (or the accumulator 415) of the compressor 410 and the outdoor heat exchanger 420. In addition, the controller 60 adjusts the opening degree of the defrost expansion valve 313 to expand the refrigerant flowing from the indoor unit liquid pipe 550 toward the outdoor unit 40.

In the defrosting operation of the first indoor heat exchanger 521 and the refrigeration operation of the second indoor heat exchanger 522, the controller 60 closes the first-first solenoid valve 141 and the second-second solenoid valve 242, and opens the first-second solenoid valves 142 and second-first solenoid valve 241. In addition, the controller 60 opens the first indoor expansion valve 531 completely, and adjusts the opening degree of the second indoor expansion valve 532 to expand the refrigerant flowing toward the second indoor heat exchanger 521 from the first indoor heat exchanger 521.

The refrigerant is compressed into a vapor state of high temperature and high pressure by the compressor 410, and is discharged together with oil. The high temperature and high pressure gas refrigerant and oil discharged from the compressor 410 are introduced into the oil separator 470, and separated from each other, so that the refrigerant is introduced into the four-way valve 430 and the oil is recovered into the inlet flow path of the compressor 410.

The refrigerant discharged from the compressor 410 is guided to the outdoor unit gas pipe 440 by the four-way valve 430, and flows into the continuous refrigeration apparatus 10 through the outdoor unit gas pipe 440.

The refrigerant introduced into the continuous refrigeration apparatus 10 flows into the first gas control unit 100, and flows into the first indoor heat exchanger gas pipe 541 through the first-third flow path 130.

The refrigerant introduced into the indoor unit 50 through the first indoor heat exchanger gas pipe 541 emits heat and is condensed while passing through the first indoor heat exchanger 521, and remove the frost formed in the first indoor heat exchanger 521. The operation of the indoor blower fan installed in the first indoor heat exchanger 521 side may be stopped, thereby removing the frost by the heat emitted from the refrigerant while minimizing the emitting of heat into the indoor space.

A part of the refrigerant discharged from the first indoor heat exchanger 521 may be introduced into the first pipe 310 through the indoor unit liquid pipe 550, pass through the defrost expansion valve 313, and be expanded in a refrigerant state having a low dry of low temperature and low pressure.

The remaining part of the refrigerant discharged from the first indoor heat exchanger 521 passes through the second indoor expansion valve 532 and is expanded in a two-phase refrigerant state having a low dry of low temperature and low pressure, and is introduced to the second indoor heat exchanger 522.

The refrigerant introduced into the second indoor heat exchanger 522 may evaporate while exchanging heat with the indoor air, and may provide cold air to the indoor space. Unlike the indoor blower fan installed in the first indoor heat exchanger 521 side, the indoor blower fan installed in the second indoor heat exchanger 522 side may be operated. Therefore, during the defrosting operation of the first indoor heat exchanger 521, the second indoor heat exchanger 522 may be operated in a refrigeration operation to continuously provide cold air to the indoor space.

The refrigerant discharged from the second indoor heat exchanger 522 is introduced into the second gas control unit 200, sequentially flows through the second-second flow path 220, the second-first flow path 210, and the second pipe 320, and introduced into the outdoor unit 40 through the outdoor unit gas pipe 440 together with the refrigerant expanded through the defrost expansion valve 313.

The refrigerant introduced into the outdoor unit 40 through the outdoor unit gas pipe 440 flows into the outdoor heat exchanger 420, and heat-exchanges with outdoor air in the outdoor heat exchanger 420. The refrigerant discharged from the outdoor heat exchanger 420 is guided to the accumulator 415 by the four-way valve 430, supplied to the compressor 410 in a vapor state by the accumulator 415, and is supplied to the compressor 410 together with oil recovered by the oil separator 470.

Accordingly, the first indoor heat exchanger 521 may serve as a condenser, and the second indoor heat exchanger 522 and the outdoor heat exchanger 420 may serve as an evaporator.

Meanwhile, unlike shown in FIG. 4, in the refrigeration operation of the first indoor heat exchanger 521 and the defrosting operation of the second indoor heat exchanger 522, the controller 60 opens the first-first solenoid valve 141 and the second-second solenoid valve 242, and closes the first-second solenoid valve 142 and the second-first solenoid valve 241. In addition, the controller 60 adjusts the opening degree of the first indoor expansion valve 531 to expand the refrigerant flowing from the second indoor heat exchanger 522 to the first indoor heat exchanger 521, and fully opens the second indoor expansion valve 532.

The flow of the refrigerant in the outdoor unit 40 is the same as in the defrosting operation of the first indoor heat exchanger 521.

The refrigerant introduced into the continuous refrigeration apparatus 10 from the outdoor unit gas pipe 440 is introduced into the second gas control unit 200, and flow to the gas pipe 542 of the second indoor heat exchanger through the second-third flow path 230.

The refrigerant introduced into the indoor unit 50 through the second indoor heat exchanger gas pipe 542 is condensed by emitting heat while passing through the second indoor heat exchanger 522, and can remove the frost formed in the second indoor heat exchanger 522. The operation of the indoor blower fan installed in the second indoor heat exchanger 522 side may be stopped. Accordingly, the heat emitted from the refrigerant may remove the frost, while the heat-emitting to the indoor space can be minimized.

A part of the refrigerant discharged from the second indoor heat exchanger 522 may be introduced into the first pipe 310 through the indoor unit liquid pipe 550, pass through the defrost expansion valve 313, and may be expanded in a two-phase refrigerant state having a low dry of low temperature and low pressure while passing through the defrost expansion valve 313.

The remaining part of the refrigerant discharged from the second indoor heat exchanger 522 passes through the first indoor expansion valve 531 and is expanded in a two-phase refrigerant state having a low dry of low temperature and low pressure, and is introduced to the first indoor heat exchanger 521.

The refrigerant introduced into the first indoor heat exchanger 521 may evaporate while exchanging heat with the indoor air, and may provide cold air to the indoor space. The indoor blower fan installed in the first indoor heat exchanger 521 side may be operated, and during the defrosting operation of the second indoor heat exchanger 522, the first indoor heat exchanger 521 may work in a refrigeration operation to continuously provide cold air to the indoor space.

The refrigerant discharged from the first indoor heat exchanger 521 is introduced into the first gas control unit 100, sequentially flows through the first-second flow path 120, the first-first flow path 110, and the second pipe 320, and is introduced into the outdoor unit 40 through the outdoor unit gas pipe 440 together with the refrigerant expanded through the defrost expansion valve 313.

The first indoor heat exchanger 521 and the outdoor heat exchanger 420 may serve as an evaporator, and the second indoor heat exchanger 522 may serve as a condenser.

Meanwhile, unlike shown in FIG. 4, in the defrosting operation of both the first indoor heat exchanger 521 and the second indoor heat exchanger 522, the controller 60 closes the first-first solenoid valve 141 and the second-first solenoid valve 241, and opens the first-second solenoid valve 142 and the second-second solenoid valve 242. In addition, the controller 60 completely opens the first indoor expansion valve 531 and the second indoor expansion valve 532.

The flow of the refrigerant in the outdoor unit 40 is the same as in the defrosting operation of any one indoor heat exchanger 520.

A part of the refrigerant introduced from the outdoor unit gas pipe 440 into the continuous refrigeration apparatus 10 flows into the first gas control unit 100, flows to the gas pipe 541 of the first indoor heat exchanger through the first-third flow path 130, emits heat and is condensed while passing through the first indoor heat exchanger 521, and removes the frost formed in the first indoor heat exchanger 521.

The remaining part of the refrigerant introduced into the continuous refrigeration apparatus 10 from the outdoor unit gas pipe 440 may be introduced into the second gas control unit 200, flow to the gas pipe 542 of the second indoor heat exchanger through the second-third flow path 230, discharge heat and be condensed while passing through the second indoor heat exchanger 522, and remove the frost formed in the second indoor heat exchanger 522.

The refrigerants discharged from the first indoor heat exchanger 521 and the second indoor heat exchanger 522 flow together into the first pipe 310, and are expanded in a two-phase refrigerant state of low-temperature, low-pressure by the defrost expansion valve 313 and flow into the outdoor unit 40.

Such operation cannot provide cold air to the indoor space. For example, when the indoor unit 50 is installed in a low temperature warehouse, it is preferable to perform defrosting operation of all of the plurality of indoor heat exchangers when there is no product to maintain the low temperature in the low temperature warehouse.

Therefore, in the defrosting operation of the indoor heat exchanger 520, preferably, when the defrosting operation of the first indoor heat exchanger 521 is performed, the second indoor heat exchanger 522 performs a refrigeration operation, and when the defrosting operation of the second indoor heat exchanger 522 is performed, the first indoor heat exchanger 521 performs a refrigeration operation. In this case, it is possible to continuously provide cold air to the indoor space while performing the defrosting operation.

According to the air conditioner of the present disclosure, there are one or more of the following effects.

First, the air conditioner of the present disclosure includes the continuous refrigeration apparatus for connecting the outdoor unit and an indoor unit including the plurality of indoor heat exchangers. The continuous refrigeration apparatus includes the first gas control unit for connecting the gas pipe of the outdoor unit and the first indoor heat exchanger, the second gas control unit connecting the gas pipe of the outdoor unit and the second indoor heat exchanger, the first pipe connecting the liquid pipe of the outdoor unit and the liquid pipe of the indoor unit, and the second pipe connecting the first pipe, and the first gas control unit and the second gas control unit. The first gas control unit and the second gas control unit may include the second flow path through which the refrigerant flows during the refrigeration operation and the third flow path through which the refrigerant flows during the defrosting operation. Among the plurality of indoor heat exchangers, some indoor heat exchangers perform defrosting operation, and the remaining indoor heat exchanger may perform a refrigeration operation, thereby providing continuous cooling air to the indoor space in which the indoor heat exchanger is installed.

Secondly, one end of the first gas control unit and one end of the second gas control unit are converged to be connected to the gas pipe of the outdoor unit, so that some of the plurality of indoor heat exchangers perform defrosting operation, and the other indoor heat exchangers perform a refrigeration operation, while the indoor unit and the indoor unit can be connected by two pipes, thereby reducing the cost.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

What is claimed is:

1. An air conditioner, comprising:
   an outdoor unit comprising a compressor that compresses a refrigerant, and an outdoor heat exchanger that performs heat-exchange between outdoor air and the refrigerant;
   an indoor unit comprising a plurality of indoor heat exchangers that performs heat-exchange between indoor air and the refrigerant, and a plurality of indoor expansion valves which is connected to the plurality of indoor heat exchangers and expands the refrigerant; and
   a continuous refrigeration apparatus permitting cooling to continue with at least one of the plurality of indoor heat exchangers providing cooling, while at least one other of the plurality of indoor heat exchangers is undergoing defrosting, the continuous refrigeration apparatus comprising a first gas control unit connected to a first indoor heat exchanger of the plurality of indoor heat exchangers, a second gas control unit connected to a second indoor heat exchanger of the plurality of indoor heat exchangers, a first pipe that connects a liquid pipe of the outdoor unit and a liquid pipe of the indoor unit, and a second pipe which is branched from the first pipe and connected to the first gas control unit and the second gas control unit, wherein the first gas control unit comprises:
   a first-first flow path that connects the first gas control unit to the second pipe;
   a first-second flow path which is connected to the first-first flow path, and through which the refrigerant discharged from the first indoor heat exchanger flows during a refrigeration operation of the first indoor heat exchanger;
   a first-third flow path which is connected in parallel with the first-second flow path, and guides the refrigerant discharged from the compressor to the first indoor heat exchanger during a defrosting operation of the first indoor heat exchanger;
   a first-first solenoid valve which is installed in the first-first flow path, and controls a flow of the refrigerant flowing through the first-first flow path;
   a first-second solenoid valve which is installed in the first-third flow path, and controls a flow of the refrigerant flowing through the first-third flow path;
   a first-first check valve which is installed in the first-second flow path, and blocks a flow, toward the first-first flow path and the first-second flow path, of the refrigerant introduced into the first gas control unit from the gas pipe of the outdoor unit, and guides the refrigerant toward the first-third flow path; and
   a first-second check valve which is installed in the first-third flow path, and blocks a flow of the refrigerant, which is introduced into the first gas control unit from the first indoor heat exchanger, flowing through the first-third flow path, and guides the refrigerant toward the first-second flow path, and connects a gas pipe of the outdoor unit and the first indoor heat exchanger, wherein the second gas control unit comprises:
   a second-first flow path that connects the second gas control unit to the second pipe;
   a second-second flow path which is connected to the second-first flow path, and through which the refrigerant discharged from the second indoor heat exchanger flows during a refrigeration operation of the second indoor heat exchanger;
   a second-third flow path which is connected in parallel with the second-second flow path, and guides the refrigerant discharged from the compressor to the second indoor heat exchanger during a defrosting operation of the second indoor heat exchanger;
   a second-first solenoid valve which is installed in the second-first flow path, and controls a flow of the refrigerant flowing through the second-first flow path;
   a second-second solenoid valve which is installed in the second-third flow path, and controls a flow of the refrigerant flowing through the second-third flow path;
   a second-first check valve which is installed in the second-second flow path, and blocks a flow, toward the second-first flow path and the second-second flow path, of the refrigerant introduced into the second gas control unit from the gas pipe of the outdoor unit, and guides the refrigerant toward the second-third flow path; and
   a second-second check valve which is installed in the second-third flow path, and blocks a flow of the refrigerant, which is introduced into the second gas control unit from the second indoor heat exchanger, flowing through the second-third flow path, and guides the refrigerant toward the second-second flow path, and connects the gas pipe of the outdoor unit and the second indoor heat exchanger.

2. The air conditioner of claim 1, wherein the outdoor unit comprises a four-way valve that guides the refrigerant discharged from the compressor to the outdoor heat exchanger or the indoor heat exchanger selectively, wherein the four-way valve guides the refrigerant discharged from the compressor to the outdoor heat exchanger, in the refrigeration operation of all the plurality of indoor heat exchangers, and guides the refrigerant discharged from the compressor to the gas pipe of the outdoor unit, in the defrosting operation of at least one of the plurality of indoor heat exchangers.

3. The air conditioner of claim 1, wherein the continuous refrigeration apparatus comprises a plurality of gas control units comprising the first gas control unit and the second gas control unit, wherein the plurality of gas control units is provided in the same number of the plurality of indoor heat exchangers.

4. The air conditioner of claim 1, wherein a first end of the first pipe is connected to the liquid pipe of the outdoor unit and a second end is connected to the liquid pipe of the indoor unit, wherein a first end of the first gas control unit and a first end of the second gas control unit are converged to be connected to the gas pipe of the outdoor unit, and wherein a second end of the first gas control unit is connected to the first indoor heat exchanger, and a second end of the second gas control unit is connected to the second indoor heat exchanger.

5. The air conditioner of claim 1, wherein the first-first solenoid valve is opened during the refrigeration operation of the first indoor heat exchanger, and is closed during the defrosting operation of the first indoor heat exchanger, wherein the first-second solenoid valve is opened during the defrosting operation of the first indoor heat exchanger, and is closed during the refrigeration operation of the first indoor heat exchanger and the defrosting operation of the second indoor heat exchanger, wherein the second-first solenoid valve is opened during the refrigeration operation of the second indoor heat exchanger, and is closed during the defrosting operation of the second indoor heat exchanger, and wherein the second-second solenoid valve is opened during the defrosting operation of the second indoor heat exchanger, and is closed during the defrosting operation of the first indoor heat exchanger and the refrigeration operation of the second indoor heat exchanger.

6. The air conditioner of claim 4, wherein the continuous refrigeration apparatus further comprises:
a defrost expansion valve installed in the first pipe;
a first pipe check valve which is disposed in parallel with the defrost expansion valve and blocks a refrigerant flow flowing from the indoor unit to the outdoor unit; and
a second pipe check valve which is installed in the second pipe and blocks a flow of the refrigerant flowing from the first pipe to the second pipe.

7. The air conditioner of claim 1, wherein the plurality of indoor expansion valves comprises:
a first indoor expansion valve which is installed in a flow path that connects the first indoor heat exchanger and the liquid pipe of the indoor unit; and
a second indoor expansion valve which is installed in a flow path that connects the second indoor heat exchanger and the liquid pipe of the indoor unit.

8. An air conditioner, comprising:
an outdoor unit comprising a compressor that compresses a refrigerant, an outdoor heat exchanger that performs heat-exchange between outdoor air and the refrigerant, an outdoor unit gas pipe connected to the compressor, and an outdoor unit liquid pipe connected to the outdoor heat exchanger;
an indoor unit comprising a plurality of indoor heat exchangers that performs heat-exchange between indoor air and the refrigerant, a plurality of indoor unit gas pipes connected to a first end of the plurality of indoor heat exchangers respectively, an indoor unit liquid pipe connected to a second end of the plurality of indoor heat exchangers, and a plurality of indoor expansion valves installed in a flow path that connects the indoor unit liquid pipe and the plurality of indoor heat exchangers respectively; and
a continuous refrigeration apparatus permitting cooling to continue with at least one of the plurality of indoor heat exchangers providing cooling, while at least one other of the plurality of indoor heat exchangers is undergoing defrosting, the continuous refrigeration apparatus being disposed between the outdoor unit and the indoor unit, connects the outdoor unit gas pipe and the plurality of indoor unit gas pipes, and connects the outdoor unit liquid pipe and the indoor unit liquid pipe, wherein the continuous refrigeration apparatus comprises:
a plurality of gas control units which are connected to the outdoor unit gas pipe, and branched to be connected to the plurality of indoor unit gas pipes respectively;
a first pipe having a first end connected to the outdoor unit liquid pipe, and a second end connected to the indoor unit liquid pipe; and
a second pipe that connects the first pipe and the plurality of gas control units, wherein each of the plurality of gas control units comprises:
a first flow path that connects the gas control unit and the second pipe;
a second flow path which is connected to the first flow path, and connects the outdoor unit gas pipe and the indoor unit gas pipe; and
a third flow path connected in parallel with the second flow path.

9. The air conditioner of claim 8, wherein each of the plurality of gas control units comprises:
a first solenoid valve installed in the first flow path;
a first check valve which is installed in the second flow path, installed closer to the outdoor unit side than a point at which the first flow path and the second flow path are connected, and blocks a flow of the refrigerant flowing from the outdoor unit toward the first flow path and the second flow path;
a second solenoid valve installed in the third flow path; and
a second check valve which is installed in the third flow path, installed closer to the indoor unit side than the second solenoid valve, and blocks a flow of the refrigerant flowing from the indoor unit to the third flow path.

10. The air conditioner of claim 9, wherein the continuous refrigeration apparatus further comprises:
a defrost expansion valve installed in the first pipe;
a first pipe check valve which is disposed in parallel with the defrost expansion valve, and blocks a refrigerant flow flowing from the indoor unit to the outdoor unit; and
a second pipe check valve which is installed in the second pipe and installed closer to the liquid pipe side of the outdoor unit than the plurality of gas control units, and blocks a flow of the refrigerant flowing from the first pipe to the second pipe.

\* \* \* \* \*